United States Patent
Pope et al.

(10) Patent No.: US 10,141,699 B1
(45) Date of Patent: Nov. 27, 2018

(54) INTEGRATED AUDIO JACK HOUSING

(71) Applicant: Microsoft Technology Licensing, LLC, Redmond, WA (US)

(72) Inventors: Michael Thomas Pope, Sammamish, WA (US); Christina Ashley Yee, Redmond, WA (US); David Kazmierz Szczypinski, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/603,369

(22) Filed: May 23, 2017

(51) Int. Cl.
*H01R 24/76* (2011.01)
*G06F 1/16* (2006.01)
*H01R 24/58* (2011.01)
*H01R 43/26* (2006.01)

(52) U.S. Cl.
CPC ........... *H01R 24/76* (2013.01); *G06F 1/1656* (2013.01); *H01R 24/58* (2013.01); *H01R 43/26* (2013.01)

(58) Field of Classification Search
CPC ...................................................... H01R 24/76
See application file for complete search history.

(56) References Cited

U.S. PATENT DOCUMENTS

| | | | |
|---|---|---|---|
| 4,367,907 A * | 1/1983 | Buck ....................... | H01R 24/58 439/188 |
| 6,004,146 A * | 12/1999 | Tan ................... | H01R 13/65802 439/92 |
| 7,922,543 B1 | 4/2011 | Chen | |
| 8,469,749 B2 | 6/2013 | Ladouceur et al. | |
| 8,717,748 B2 | 5/2014 | Schwalbach et al. | |
| 9,608,358 B2 * | 3/2017 | Yoon ....................... | H01R 24/58 |
| 2006/0089054 A1 * | 4/2006 | Woo ........................ | H01R 24/58 439/668 |

(Continued)

FOREIGN PATENT DOCUMENTS

| EP | 2309602 A1 | 4/2011 |
|---|---|---|
| WO | 2014035722 A1 | 3/2014 |

OTHER PUBLICATIONS

Allain, Rhett, "The Physics of How Your Earphone Jack Works (Just in Time to Say Goodbye)", https://www.wired.com/2016/09/physics-earphone-jack-works-just-time-say-goodbye/, Published on: Sep. 6, 2016, 7 pages.

(Continued)

*Primary Examiner* — James Harvey
(74) *Attorney, Agent, or Firm* — Talem IP Law, LLP (57) ABSTRACT

Technologies are described for an audio jack housing configured to concentrically align with an opening in a chassis of a computing device and to accept a plug associated with external audio components. When the housing is aligned with the opening, a snout of the audio jack housing abuts an interior surface of the opening and does not protrude into the opening. The chassis where the opening is located may be constructed from a plastic material to reduce a risk of shorting-out when a metal plug is inserted into the housing. The chassis may include alignment features to concentrically align the audio jack housing with the opening during assembly, such that interior edges of the opening and interior edges of the snout are flush creating a smooth interior entry into the audio jack housing through the opening and the snout.

19 Claims, 9 Drawing Sheets

(56) References Cited

U.S. PATENT DOCUMENTS

| | | | |
|---|---|---|---|
| 2007/0298664 A1* | 12/2007 | Tsai | H01R 13/622 |
| | | | 439/668 |
| 2011/0195611 A1* | 8/2011 | Little | H01R 13/52 |
| | | | 439/668 |
| 2011/0255259 A1 | 10/2011 | Weber et al. | |
| 2012/0052705 A1* | 3/2012 | Su | H01R 13/7033 |
| | | | 439/188 |
| 2012/0156901 A1 | 6/2012 | Ladouceur et al. | |
| 2014/0030931 A1* | 1/2014 | Seitz | H01R 24/76 |
| | | | 439/682 |
| 2014/0055966 A1 | 2/2014 | Tan et al. | |
| 2014/0193024 A1 | 7/2014 | Raff | |
| 2015/0263443 A1 | 9/2015 | Zhang et al. | |
| 2016/0064812 A1 | 3/2016 | Han et al. | |
| 2016/0065703 A1 | 3/2016 | Rao et al. | |

OTHER PUBLICATIONS

"International Search Report and Written Opinion Issued in PCT Application No. PCT/US18/028974", dated Jun. 15, 2018, 15 Pages.

\* cited by examiner

INTEGRATED AUDIO JACK HOUSING

BACKGROUND

Many computing devices, such as laptops, tablets, and mobile phones, and consoles, as well as single purpose audio players include audio jacks to enable connection to external components for inputting or outputting an audio source. These external components can include external speakers, headphones, microphones, and musical instruments. An external component connects to the computing device or audio player via an audio plug that inserts into the audio jack of the computing device or audio player.

Often, the audio jack is generally accessible through an opening, or socket, in the casing, or housing, of the device. However, the housing of devices is often formed of conductive material. Since many audio plugs are also formed of conductive material, contact between the metal plug and the metal audio jack opening may cause a short. In order to avoid creating the short, insulative material is used to isolate the two conductive parts. In some cases, an additional concentric insulation ring is inserted within the audio jack opening to line the opening and buffer the plug from contacting the conductive housing. However, the concentric insulation ring may be difficult to accurately align with the audio jack opening, resulting in an area for defects during the manufacturing processes due, for example, to a gap between the concentric insulation ring and the audio jack opening or other misalignment faults.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

Technologies are described for an audio jack housing configured to concentrically align with an opening formed in a chassis of a computing device and configured to accept insertion of a plug associated with external audio components. When the audio jack housing is in position and aligned with the opening in the chassis, a snout of the audio jack housing abuts an internal surface of the chassis around the opening and does not protrude into the opening. That is, the snout does not protrude past an interior edge of the opening. The chassis of the computing device where the opening is located may be constructed from a plastic material to reduce a risk of shorting out when a metal plug is inserted into the audio jack housing. An inner support surface of the chassis may include alignment features to concentrically align the audio jack housing with the opening during assembly, such that interior edges of the opening and the edges of the snout are flush creating a smooth entry into the audio jack housing through the opening and the snout.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

The detailed description provided below in connection with the appended drawings is intended as a description of examples and is not intended to represent the only forms in which the present examples may be constructed or utilized. The description sets forth functions of the examples and sequences of steps for constructing and operating the examples. However, the same or equivalent functions and sequences may be accomplished by different examples.

References to "one implementation," "an implementation," "one example," "an example" and the like, indicate that the described implementation or example may include a particular feature, structure or characteristic, but every implementation or example may not necessarily include the particular feature, structure or characteristic. Moreover, such phrases are not necessarily referring to the same implementation or example. Further, when a particular feature, structure or characteristic is described in connection with an implementation or example, it is to be appreciated that such feature, structure or characteristic may be implemented in connection with other implementations or examples whether or not explicitly described.

Numerous specific details are set forth in order to provide a thorough understanding of one or more aspects of the described subject matter. It is to be appreciated, however, that such aspects may be practiced without these specific details. While certain components are shown in block diagram form to describe one or more aspects, it is to be understood that functionality performed by a single component may be performed by multiple components. Similarly, a single component may be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the scope of the claimed subject matter.

Figure 1A:
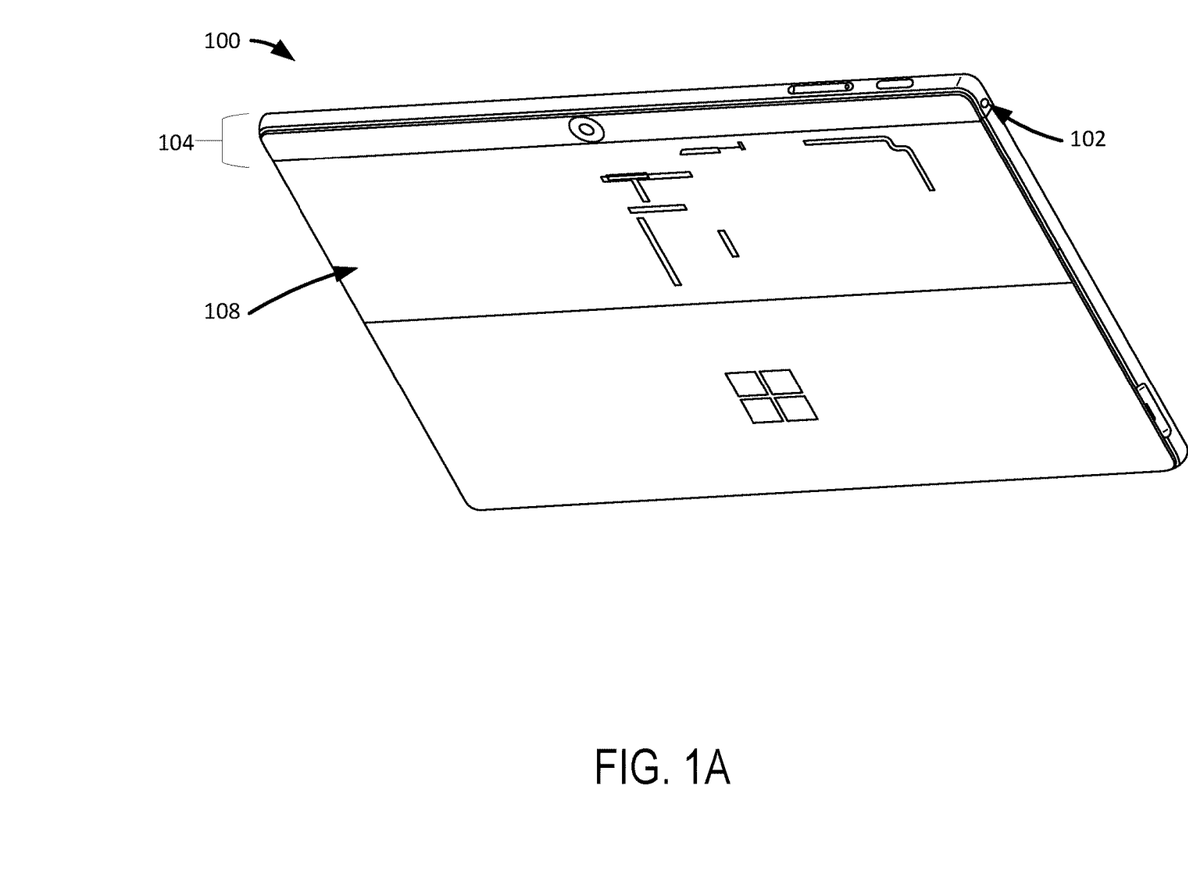
FIGS. 1A-1B illustrate perspective views of some implementations of an example device that includes an integrated audio jack housing.
Figure 1B:
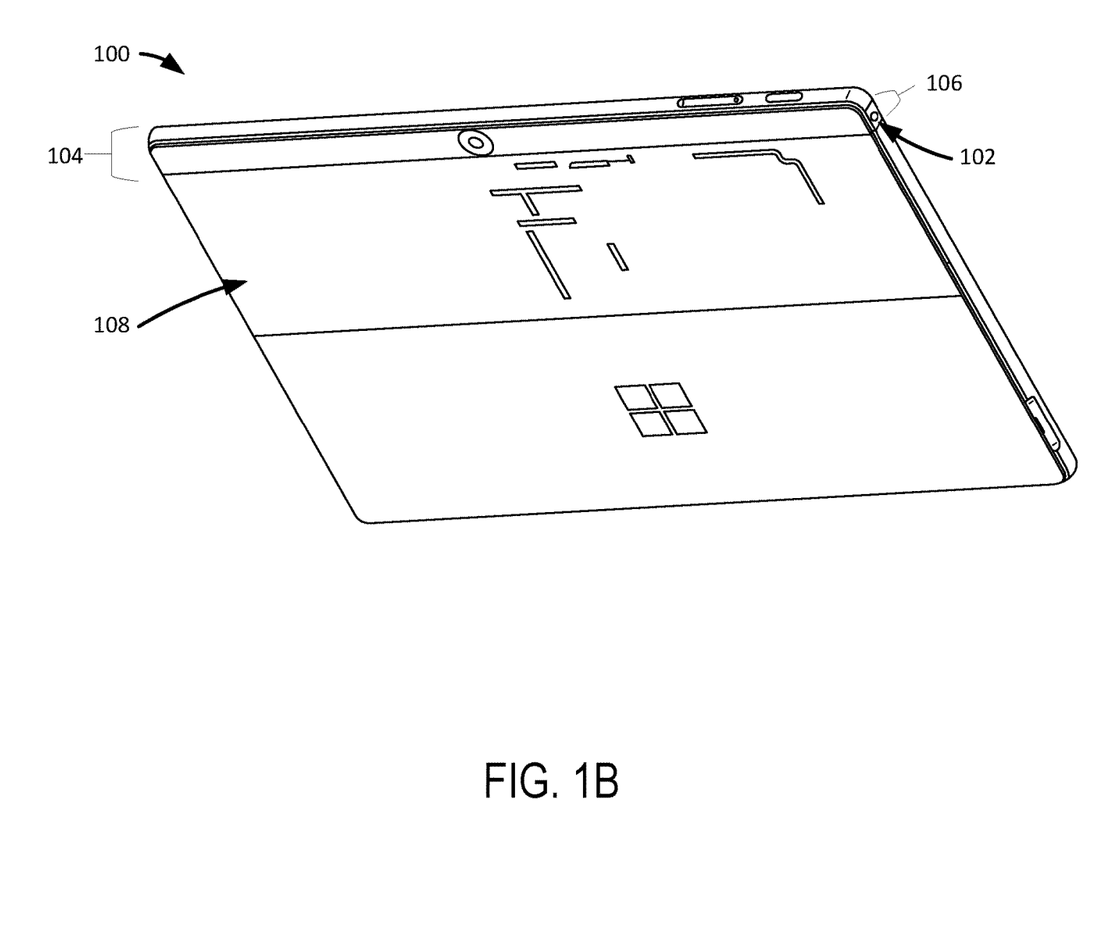

FIGS. 1A-1B illustrate perspective views of some implementations of an example device that includes an integrated audio jack housing.

In this example, computing device 100 may be a computing device such as a tablet, mobile device, or a notebook that includes an opening 102 for insertion of an audio plug associated with an external audio device. The computing device 100 (e.g. the computing device) may include a display screen, such as a touch sensitive display screen. The computing device can also include computing elements such as processor, memory/storage, a battery, and/or a video or graphics processor, among other components/elements. The computing device 100 may also be a laptop or a personal computer that also includes a second portion secured to the computing device 100 such as a keyboard.

In some examples an external portion of the computing device 100 may be constructed from various materials for various functional and/or cosmetic reasons. For purposes of this Specification, the housing or structural framework of the computing device may be referred to as a "chassis." That is, the chassis may include a surrounding frame or housing and also an internal supporting structure, or an inner support surface, on which circuit boards and other internal parts and electronics of a computing device may be mounted.

In some implementations, the chassis 108 of the computing device 100 may be primarily constructed from a metal material, such as a magnesium alloy. As shown in FIGS. 1A and 1B, a combination of different materials may be used to construct the chassis 108 of computing device 100. For example, at least a portion of the computing device 100 chassis 108 may be composed from a plastic material for functional reasons, such as for antenna radiation. In the example computing device 100 shown in FIG. 1A, a portion 104 of the chassis 108 may be composed from a plastic material to enable antenna radiation. A size of the plastic portion 104 may vary based on antenna needs of the computing device 100. Other materials may also be contemplated for construction of the chassis 108. For example, other composite materials may be chosen for functional and/or cosmetic considerations.

In other examples, a portion of the computing device 100 chassis 108 may be composed from a plastic material for other functional reasons, such as to enable insertion of an audio plug within the opening 102 of the computing device 100 without causing a risk of shorting out the device. That is, in computing devices where an audio plug, which may often be a metal or other conductive material, is inserted into the opening 102 in the outer surrounding frame of the chassis 108 that is also composed from a metal material, there may be a risk that contact between the metal audio plug and the metal opening in the chassis 108 may cause the computing device to short out. Therefore, as shown in FIGS. 1A and 1B described in further detail below, the opening 102 may be formed in a portion of the surrounding frame of the chassis 108 that is composed from a plastic material, or another composite material that will not cause shorting out when a metal audio plug comes into contact with the opening 102. For example, in computing devices where a portion of the surrounding frame of the chassis 108 is composed from plastic for functional reasons, such as for antenna radiation, the opening 102 may be formed in the plastic portion of the surrounding frame of the chassis 108 where the antennae are located as shown in FIG. 1A.

In other examples, as illustrated in FIG. 1B, where a chassis may not include a plastic portion for antenna requirements or other functional reasons, a small portion 106 of the surrounding frame of the chassis 108 that includes the opening 102 may be composed from a plastic material and integrated with the metal portion of the chassis 108. This small portion 106 of the surrounding frame of the chassis 108 may be made to accommodate the opening 102, and the small portion 106 may "snap" into place within the remaining metal portion of the surrounding frame of the chassis 108 in order to allow a metal plug to be inserted within the plastic opening 102, and to reduce the risk of shorting out when the metal plug is inserted.

Figure 2A:
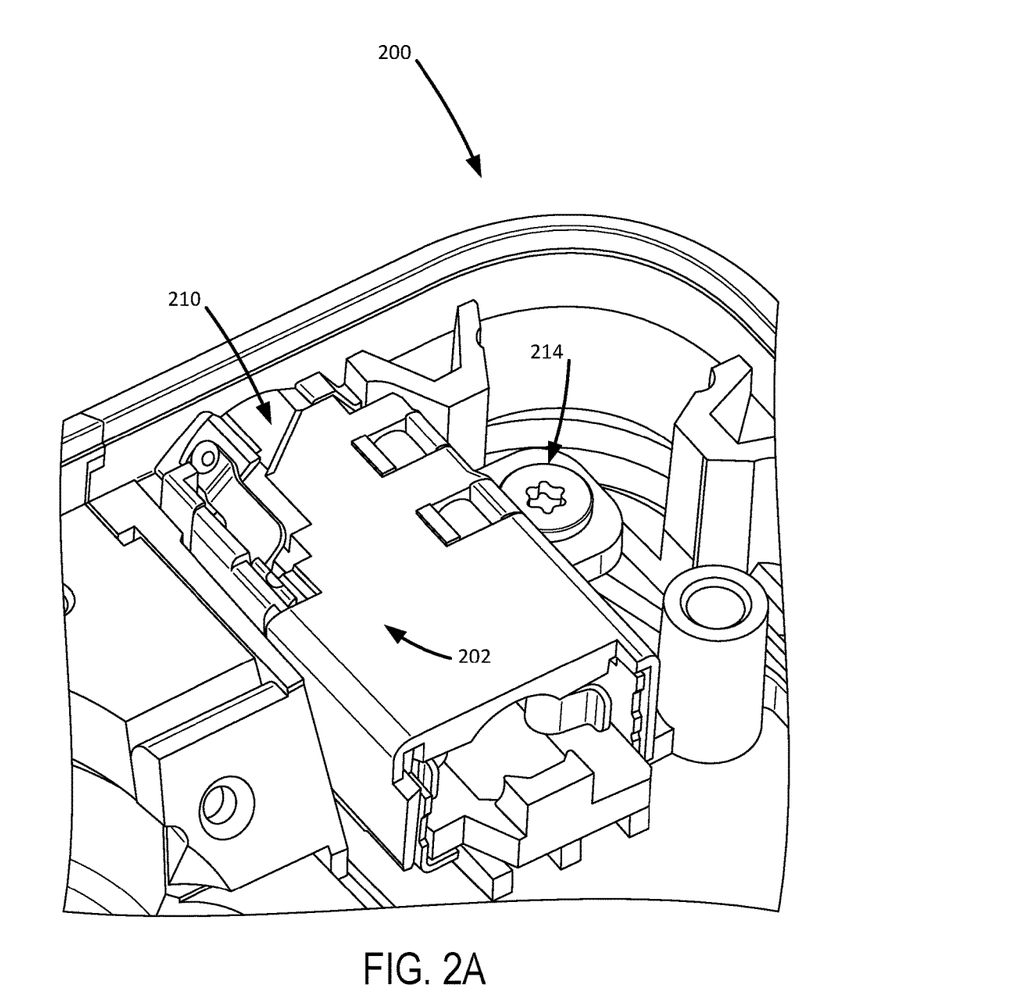
FIGS. 2A-2C illustrate partial exterior and interior views of chassis of a device with integrated audio jack housing according to an example implementation.
Figure 2B:
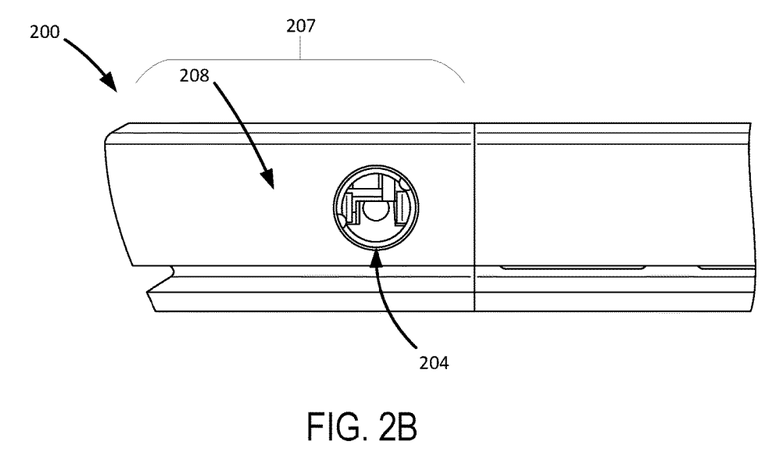
Figure 2C:
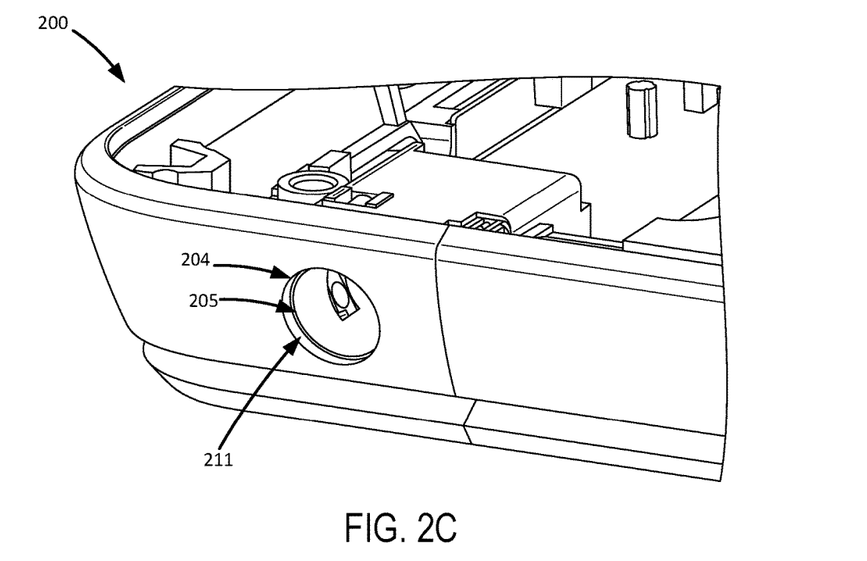

FIGS. 2A-2C illustrate partial exterior and interior views of chassis of a device with integrated audio jack housing according to an example implementation.

According to certain implementations, an audio jack housing 202 may be assembled and installed within a computing device 200 to accept insertion of an audio plug through an opening 204 of the computing device 200. As described above, a chassis 208 of the computing device 200 may have an inner support surface and outer surrounding frame. The audio jack housing may be mounted on the inner support surface of the chassis 208. The audio jack housing 202 may include a cylindrical extrusion, or a "snout" 210 which may be configured to align with and abut an interior edge of the opening 204 when the audio jack housing is mounted on the inner support surface of the chassis within the computing device 200 as shown in the interior view of FIG. 2A.

During assembly, as will be described in FIG. 3 and FIG. 4, the audio jack housing 202 may be mounted on the inner support structure of the chassis 208 of the computing device 200 and slid into position in a direction toward the opening until the snout 210 abuts the surrounding frame of the chassis 208 and is aligned with the opening 204. Once the audio jack housing 202 is aligned in position, a screw 214 may be inserted to fasten the audio jack housing 202 in place.

As shown in FIGS. 2B and 2C, in a system according to certain implementations, when the audio jack housing 202 is positioned in place on the inner support surface of the chassis 208 within the computing device 200, the snout 210 of the audio jack housing 202 is configured to concentrically align with and abut an interior edge 205 of the opening 204 of the surrounding frame of the chassis 208, and the snout 210 does not protrude into past the interior edge 205 of the opening 204.

In a system according to certain implementations, a portion 207 of the surrounding frame of the chassis 208 including the opening 204 may be composed from a plastic material. The plastic material may prevent shorting out of the computing device 200 when a metal audio plug is inserted into the opening 204. Thus, the plastic portion 207 enables the audio jack housing to remain interior to the computing device and to align with the opening 204 without protruding into the opening 204, since the risk of shorting out is reduced due to the plastic portion 207 of the surrounding frame of the chassis 208 where the opening 204 is located.

FIG. 2C illustrates another external view of the computing device 200 with the audio jack housing 202 positioned in place on the inner support surface of the chassis 208. As shown, the snout 210 of the audio jack housing 202 is aligned with and abuts an interior edge 205 of the opening 204 of the surrounding frame of the chassis 208, but does not protrude into the opening 204. Thus, an inner surface 211 of the opening 204 in the plastic portion of the chassis 208 is visible when the audio jack housing 202 is positioned in place. When an audio plug is inserted into the opening 204, the metal plug may be in contact with inner surface 211 of the opening 204.

Figure 3A:
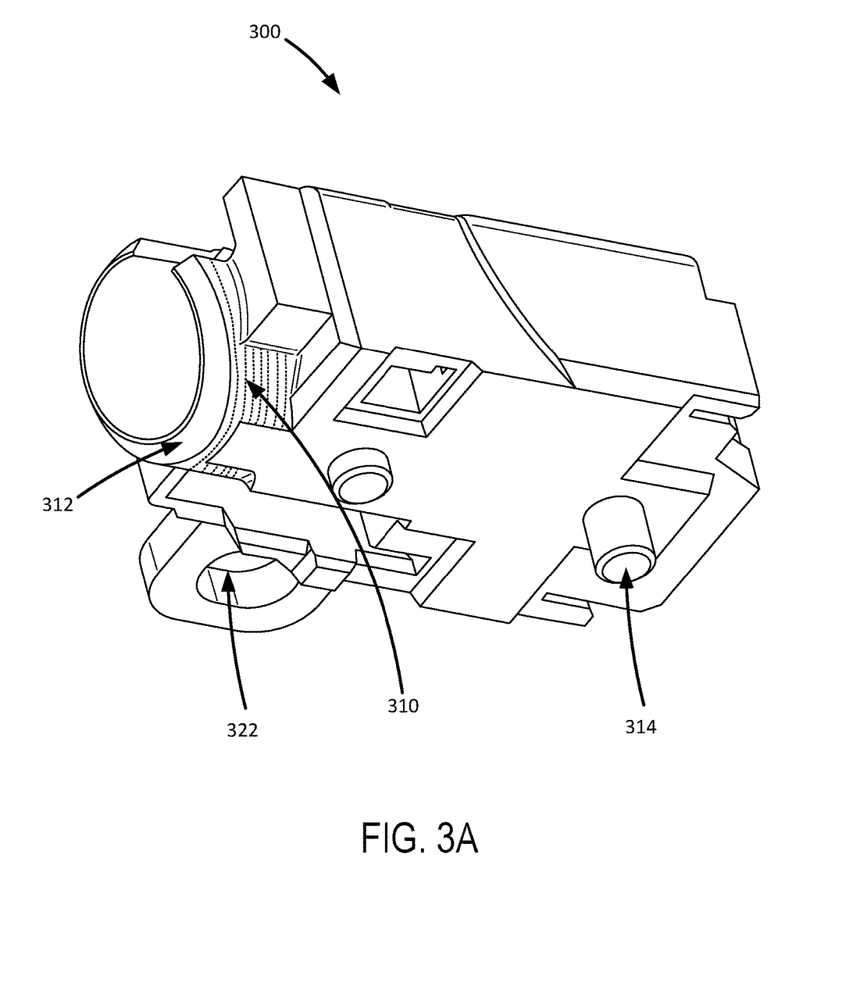
FIGS. 3A-3B illustrates an example audio jack housing.
Figure 3B:
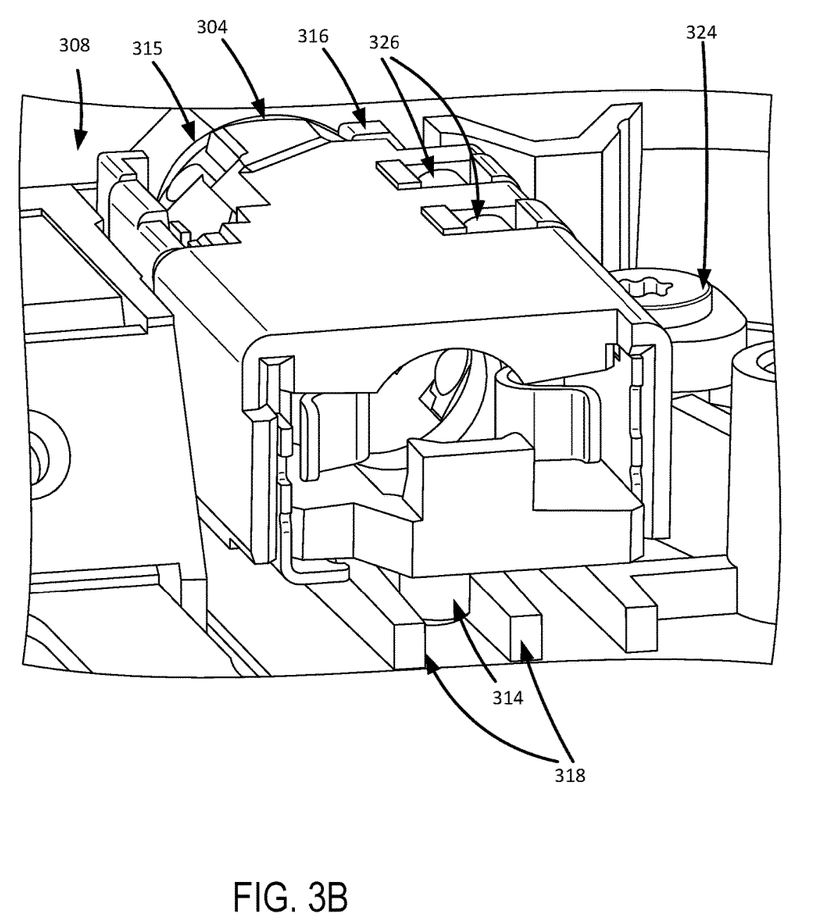

FIGS. 3A-3B illustrate an example audio jack housing.

As described above, an audio jack housing 300 may include a snout 310 which may be configured to align with and abut an opening 304 formed in a surrounding frame of a chassis 308 of a computing device. A portion of the surrounding frame and the inner support structure of the chassis 308 where the opening is located may include a plurality of alignment features to facilitate concentric alignment and abutment of the snout 310 with the opening 304 of the chassis 308.

In an example, the snout 310 may have an angled surface 312 that may be configured to align with the one or more alignment features of the chassis 308 associated with the opening. For example, the alignment features of the chassis 308 may include a coordinating angled surface (partially shown as chamfered surface 315) on an interior edge of the opening 304 (see e.g., interior edge 205 of FIG. 2C from which the coordinating angled surface can extend), and at least one cylindrical alignment rib 316 formed on the internal surface of the surrounding frame of the chassis 308 near the opening 304. These alignment features of the chassis are shown and described in more detail in FIG. 4.

As described above, during assembly the audio jack housing 300 is inserted onto the inner support structure of the chassis 308 within an interior portion of a computing device, and the audio jack housing 300 is slid into position in a direction toward the opening until the snout 310 abuts the opening in the chassis 308. In order to stabilize the audio jack housing 300 after insertion, the audio jack housing 300 may include an extended pin 314 on a bottom side, as shown in FIG. 3A.

As shown in FIG. 3B, the pin 314 may be configured to fit between at least two elongated ribs 318 or protrusions of the chassis 308 as the audio jack housing 300 is slid into place towards the opening 304, and the pin 314 may prevent the audio jack housing 300 from rotating or tipping in a direction perpendicular to the opening 304. Additionally, in order to secure the audio jack housing 300 in position on the inner support structure of the chassis 308, the audio jack housing 300 may include an opening 322 for accepting a fastener such as a screw. The opening 322 for accepting the fastener is shown in FIG. 3A. Once the audio jack housing 300 is in place where it is aligned with and abuts the opening 304 in the chassis 308, a screw 324, shown in FIG. 3B, may be inserted through the opening 322 to secure the audio jack housing 300 to the inner support structure of the chassis 308. The inner support structure of the chassis 308 may include a coordinating opening that aligns with the opening 322 of the audio jack housing 300, and the coordinating opening may be threaded to accept insertion of the screw 324 to secure the audio jack housing 300 to the chassis 308.

Figure 4A:
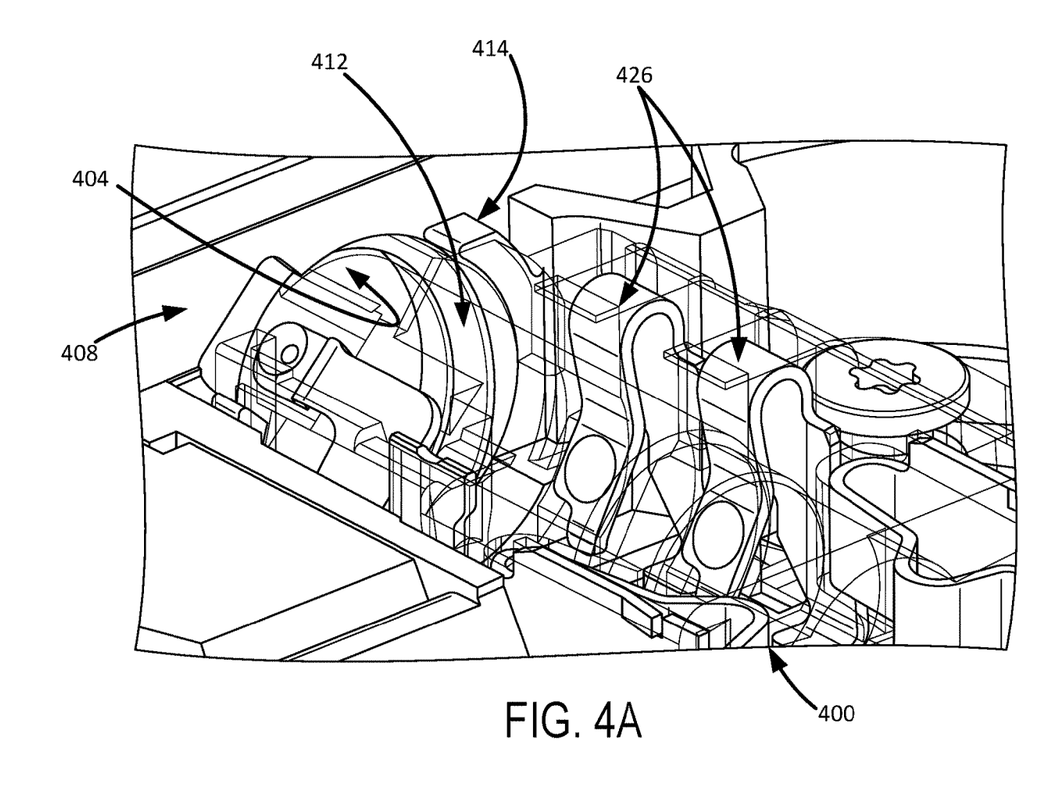
FIGS. 4A-4B illustrate one or more alignment features for aligning an audio jack housing with an opening in a chassis according to an example implementation.
Figure 4B:
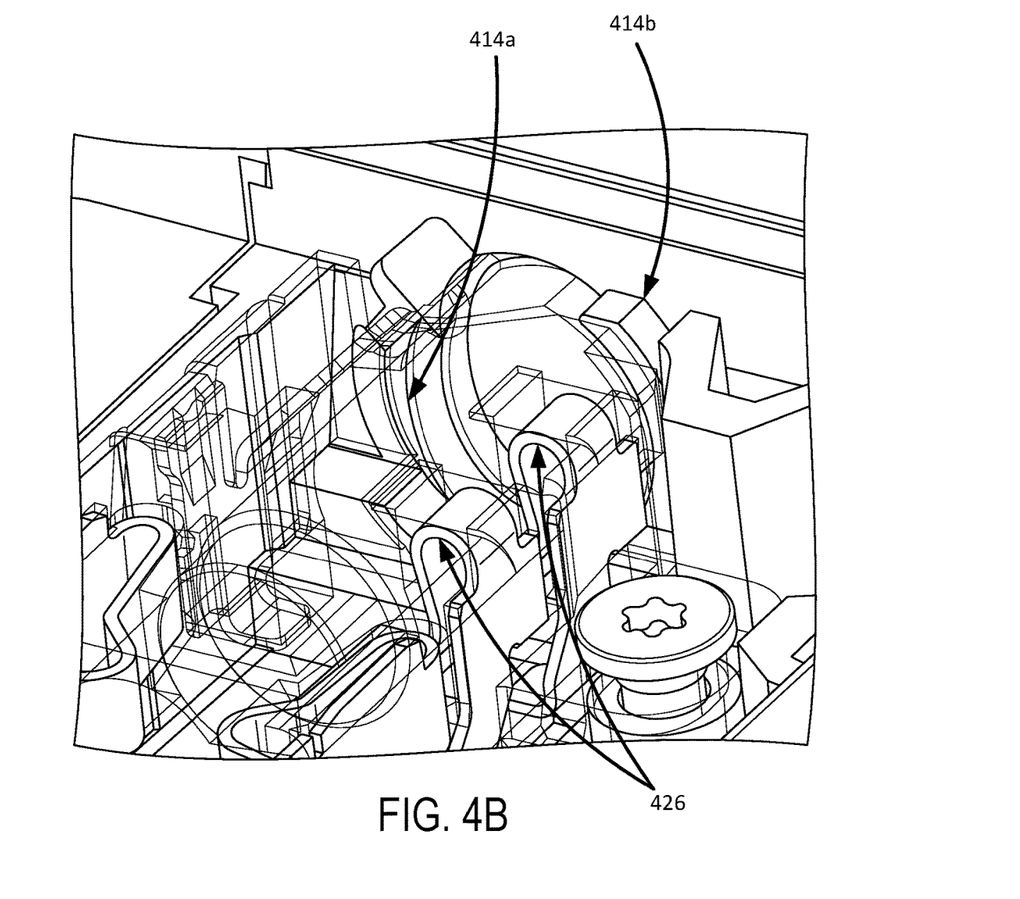

In further examples, an external portion of the audio jack housing 300 may be constructed from a plastic material, and the audio jack housing 300 may include one or more metal contacts 326, a portion of which are viewable in FIG. 3B, and which are described in further detail in FIG. 4B.

FIGS. 4A-4B illustrate one or more "alignment features" for aligning an audio jack housing with an opening in a chassis according to an example implementation.

As shown in FIG. 4A, a chassis 408 including an opening 404 may include one or more alignment features configured to align and position an inserted audio jack housing. The external portion of an inserted audio jack housing is shown as a wire frame in FIG. 4A in order to allow visibility of the alignment features of the chassis and spring contacts of the audio jack housing.

In an example, alignment features of the chassis 408 may include one or more angled or chamfered surfaces 412 and one or more alignment ribs 414 as briefly described previously. The chamfered surfaces 412 may be on an interior edge of the opening in the surrounding frame of the chassis, and may be configured to align with a coordinating angled surface (previously illustrated as angled surface 312) of a snout of the audio jack housing as described in FIG. 3A. During insertion of the audio jack housing, the chamfered surfaces 412 may act as an initial alignment lead-in to initially position the audio jack housing into approximately the desired position where the audio jack housing 400 is concentrically aligned with the opening. For example, the audio jack housing 400 may be slid in a direction towards the opening until the snout of the audio jack housing 400 comes into contact with and abuts the chamfered surfaces 412 and is prevented from sliding any further. Additionally, one or more alignment ribs 414 protruding from an internal surface of the surrounding frame of chassis 408 near the opening may concentrically position and align the audio jack housing 400 in place as the audio jack housing 400 is slid into position against the chamfered surfaces 412.

Two cylindrical alignment ribs 414 may protrude from the surrounding frame of the chassis on opposing sides of the opening, and the snout of the audio jack may be configured to fit between the two cylindrical alignment ribs 414 to concentrically align the snout of the audio jack housing with the opening. That is, the cylindrical alignment ribs 414 may partially encapsulate the snout to concentrically align the snout of the audio jack housing with the opening. Although two opposing cylindrical alignment ribs are shown and described, more or fewer ribs may be used.

As shown in FIGS. 4A and 4B, the cylindrical alignment ribs 414 may be separate partial ribs positioned on opposing sides of the opening to encapsulate the snout of the audio jack housing. For example, as shown in FIG. 4B, cylindrical alignment rib 414a may oppose cylindrical alignment rib 414b. In other examples, there may be a single contiguous cylindrical alignment rib protruding around the opening, or there may be three or more partial alignment ribs configured to concentrically encapsulate and concentrically align the snout with the opening.

As also shown in FIG. 4B, in some examples, an external portion of the audio jack housing 400 may be constructed from a plastic material, and the audio jack housing 400 may include one or more sheet metal spring contacts 426, which may be configured to make electrical contact with a metal audio plug when the audio plug is inserted into the opening. The metal contacts 426 may be composed from a sheet metal and may be constructed as spring contacts having some flexibility.

Figure 5A:
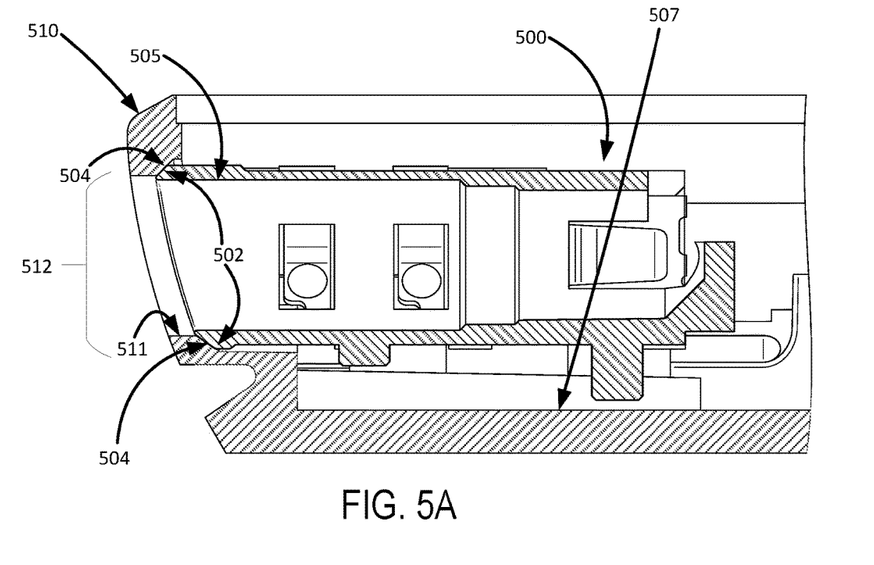
FIGS. 5A-5B illustrate cross sectional views of an audio jack housing in position and aligned with an opening in a chassis according to an example implementation.
Figure 5B:
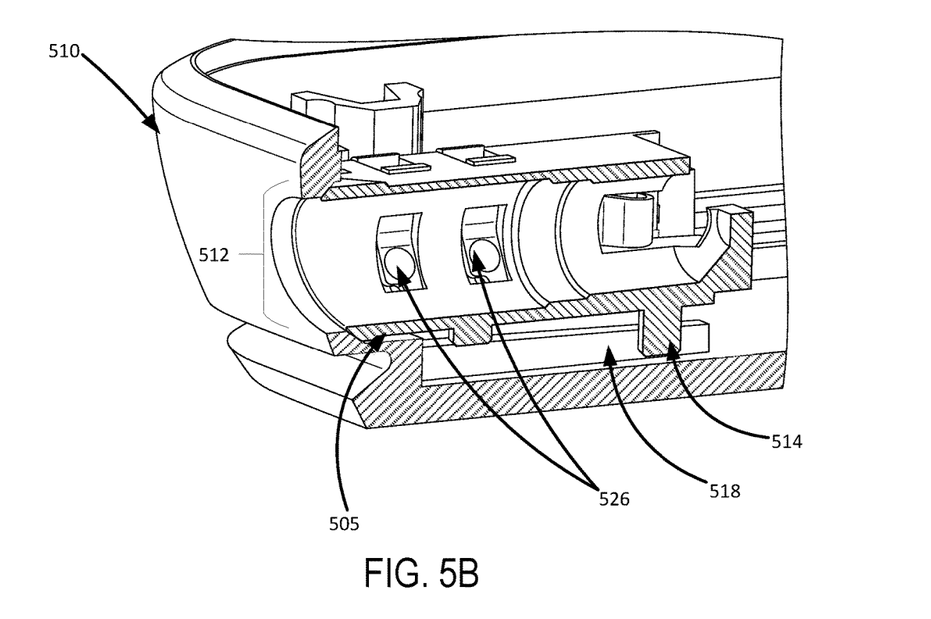

FIGS. 5A-5B illustrate cross sectional views of an audio jack housing in position and aligned with an opening in a chassis according to an example implementation.

FIGS. 5A and 5B show the audio jack housing 500 in position within a computing device where an angled surface 502 of a snout 505 of the audio jack housing 500 abuts a corresponding chamfered surface 504 of an internal surface (e.g., extending from interior edge 205 of FIG. 2C) of the opening 512 of a surrounding frame of a chassis 510 of the computing device. As described above, the chamfered surface 504 of the internal surface of the opening in the chassis 510 may act as an initial "lead-in" to guide the audio jack housing 500 into position where it abuts and is concentrically aligned with the opening 512. When the audio jack housing 500 is in position on an inner support surface 507 of the chassis 510, the snout 505 (see also angled surface 312 of snout 310 of FIG. 3A) abuts the opening in the surrounding frame of the chassis 510 and does not protrude into the opening 512 along internal surface 511. In some implementations, a size (diameter) of the snout 505 of the audio jack housing 500 may be substantially similar to the diameter of the opening 512 so that the edges allow a smooth entry for an audio plug through the opening 512 and snout 505 into the audio jack housing 500. In some examples, the diameter of the snout 505 may be substantially the same, but not exactly the same, due to tolerances. In some cases, the diameter of the snout 505 may be slightly smaller than the diameter of the opening 512. An external audio plug is designed to fit tightly within the snout 505 of the audio housing, and the opening 512 of the chassis may be bigger than the diameter of the snout 505 to ensure the audio plug fits through the opening 512 into the snout 505 of the audio jack housing.

Also shown in FIGS. 5A and 5B are one or more spring contacts 526 of the audio jack housing 500, which may be configured to come into contact with an audio plug when the audio plug is inserted into the opening 512. Additionally shown in FIGS. 5A and 5B is an extrusion pin 514 on a bottom side of the audio jack housing 500, which may be configured to fit between at least two elongated ribs 518 or protrusions of the inner support surface of the chassis 510 as the audio jack housing 500 is slid into place towards the opening 512 of the chassis 510. As described previously, the extrusion pin 514 may prevent the audio jack housing 500 from rotating or tipping.

The detailed description provided above in connection with the appended drawings is intended as a description of examples and is not intended to represent the only forms in which the present examples may be constructed or utilized.

It is to be understood that the configurations and/or approaches described herein are exemplary in nature, and that the described implementations and/or examples are not to be considered in a limiting sense, because numerous variations or methods are possible. The specific processes or methods described herein may represent one or more of any number of processing strategies. As such, various operations illustrated and/or described may be performed in the sequence illustrated and/or described, in other sequences, in parallel, or omitted. Likewise, the order of the above-described processes may be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. An integrated audio jack housing assembly comprising:
   a chassis including a surrounding frame and an inner support surface, the chassis having at least a portion thereof comprising plastic and having an opening in the portion of the surrounding frame comprising plastic, wherein an internal surface of the chassis around the opening comprises alignment features; and
   an audio jack housing abutting the internal surface of the chassis around the opening without protruding into an interior surface of the opening;
   wherein the alignment features include a chamfered surface extending from an interior edge of the opening facing the audio jack housing.

2. A method of assembling an integrated audio jack housing assembly, the method comprising:
   inserting an audio jack housing on an inner support surface of a chassis with a snout of the audio jack housing facing an opening in a plastic portion of a surrounding frame of the chassis;
   sliding the audio jack housing in a direction towards the opening of the surrounding frame of the chassis until the snout contacts an internal surface of the surrounding frame of the chassis around the opening and is aligned between two or more cylindrical alignment ribs protruding from the internal surface of the surrounding frame of the chassis near the opening, wherein the snout does not protrude into the opening; and
   fastening the audio jack housing to the inner support surface of the chassis.

3. The integrated audio jack housing assembly of claim 1, wherein the audio jack housing has a cylindrical extrusion, wherein the cylindrical extrusion includes an angled surface configured to correspond to the chamfered surface.

4. The integrated audio jack housing assembly of claim 3, wherein the internal surface of the chassis around the opening includes one or more cylindrical alignment ribs extending from at least a portion of the internal surface of the opening, the one or more cylindrical alignment ribs configured to concentrically encapsulate the cylindrical extrusion of the audio jack housing to concentrically align the cylindrical extrusion with the opening.

5. The integrated audio jack housing assembly of claim 3, wherein the audio jack housing includes at least one extrusion pin on a bottom side of the audio jack housing, the extrusion pin configured to fit between at least two elongated protrusions extending from a portion of the inner support surface of the chassis.

6. The integrated audio jack housing assembly of claim 3, wherein a diameter of the cylindrical extrusion is substantially the same as a diameter of the interior surface of the opening.

7. The integrated audio jack housing assembly of claim 1, wherein the audio jack housing includes at least one hole to enable securing the audio jack housing to the inner support surface of the chassis.

8. The integrated audio jack housing assembly of claim 7, wherein the at least one hole of the audio jack housing aligns with at least one hole in the inner support surface of the chassis when the audio jack housing abuts and is concentrically aligned with the opening in the surrounding frame of the chassis.

9. The integrated audio jack housing assembly of claim 1, wherein at least a portion of the audio jack housing comprises a plastic material.

10. The integrated audio jack housing assembly of claim 1, wherein the audio jack housing includes one or more spring contacts.

11. The integrated audio jack housing assembly of claim 10, wherein the one or more spring contacts are configured to make electrical contact with an audio plug when the audio plug is inserted into the opening in the surrounding frame of the chassis.

12. A computing device comprising:
    a chassis including a surrounding frame and an inner support surface, the chassis having at least a portion thereof comprising plastic and having an opening in the portion of the surrounding frame comprising plastic; and
    an audio jack housing abutting an internal surface of the chassis around the opening without protruding into an interior surface of the opening, wherein the audio jack housing has a cylindrical extrusion, and wherein the cylindrical extrusion concentrically aligns with one or more alignment features at an internal surface of the chassis around the opening.

13. The computing device of claim 12, wherein the one or more alignment features comprise:
    a chamfered surface extending from an interior edge of the opening and configured to abut a coordinating angled surface of the cylindrical extrusion of the audio jack housing.

14. The computing device of claim 12, wherein the one or more alignment features comprise:
    one or more cylindrical alignment ribs protruding from at least a portion of the internal surface of the chassis near the opening in the surrounding frame of the chassis, the one or more cylindrical alignment ribs configured to concentrically encapsulate the cylindrical extrusion of the audio jack housing to concentrically align the cylindrical extrusion with the opening.

15. The computing device of claim 12, wherein a diameter of the cylindrical extrusion is substantially the same as a diameter of the interior surface of the opening.

16. The computing device of claim 12, wherein the audio jack housing includes one or more spring contacts for making electrical contact with a plug inserted into the opening.

17. The computing device of claim 12, wherein the audio jack housing has at least one hole for accepting a fastener, and wherein the at least one hole aligns with at least one hole located on the inner support surface of the chassis when the audio jack housing abuts and is concentrically aligned with the opening in the surrounding frame of the chassis.

18. The method of claim 2, wherein the audio jack housing has at least one hole for accepting a fastener, and wherein the at least one hole aligns with at least one hole located on the inner support surface of the chassis when the audio jack housing abuts and is concentrically aligned with the opening in the surrounding frame of the chassis.

19. The method of claim 2, wherein an angled surface of the snout abuts a corresponding chamfered surface of the internal surface around the opening.

\* \* \* \* \*